United States Patent
Hirano (10) Patent No.: US 10,160,120 B2
(45) Date of Patent: Dec. 25, 2018

(54) WIRING STRUCTURE FOR ROBOT ARM

(71) Applicant: YAMAHA HATSUDOKI KABUSHIKI KAISHA, Shizuoka-ken (JP)

(72) Inventor: Akifumi Hirano, Shizuoka (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 0 days.

(21) Appl. No.: 14/454,290

(22) Filed: Aug. 7, 2014

(65) Prior Publication Data

US 2015/0040713 A1 Feb. 12, 2015

(30) Foreign Application Priority Data

Aug. 9, 2013 (JP) ................................. 2013-166219
Aug. 9, 2013 (JP) ................................. 2013-166220

(51) Int. Cl.
*B25J 19/00* (2006.01)
*B25J 9/00* (2006.01)
*B25J 18/00* (2006.01)

(52) U.S. Cl.
CPC ......... *B25J 19/0029* (2013.01); *B25J 9/0012* (2013.01); *B25J 9/0051* (2013.01);
(Continued)

(58) Field of Classification Search
CPC ...... B25J 9/0051; B25J 18/02; B25J 19/0029; B25J 19/0033; B25J 19/0025; B25J 9/0012; B25J 9/1623
(Continued)

(56) References Cited

U.S. PATENT DOCUMENTS 3,781,037 A * 12/1973 Czajkowski ........... H01R 35/02
174/86
4,705,243 A * 11/1987 Hartmann ............ B23K 11/362
248/160
(Continued)

FOREIGN PATENT DOCUMENTS

CN 101541483 A 9/2009
CN 102941579 A 2/2013
(Continued)

OTHER PUBLICATIONS

"6770 Series, Shimano Electronic Intelligent System." Shimano Ultegra 6770 Series Dealer's Manual Oct. 1, 2011: 1-33. PDF.*
(Continued)

*Primary Examiner* — Victor L MacArthur
*Assistant Examiner* — Joseph Brown
(74) *Attorney, Agent, or Firm* — Studebaker & Brackett PC (57) ABSTRACT

A wiring structure for a robot arm includes a pair of arm members that each have a hollow shaft shape including a first end section and a second end section, and that are arranged to be parallel to each other. A wire-shaped body is introduced into the arm member from the first end section and led out of the arm member through the second end section so as to penetrate at least one of the pair of arm members in an axis direction of the arm member. A regulating member is provided at least in an intermediate region of the arm member in the longitudinal direction to regulate a displacement of the wire-shaped body within the arm member in a radial direction of the arm member.

12 Claims, 8 Drawing Sheets

(52) U.S. Cl.
CPC ........... B25J 18/00 (2013.01); B25J 19/0025 (2013.01); *Y10T 74/20311* (2015.01)

(58) Field of Classification Search
USPC ...................... 74/490.01, 490.02; 901/15, 18
See application file for complete search history.

(56) References Cited

U.S. PATENT DOCUMENTS

| | | | | |
|---|---|---|---|---|
| 4,767,257 | A * | 8/1988 | Kato | B25J 19/0025 285/190 |
| 4,913,613 | A * | 4/1990 | Hirschmann | B23Q 1/0009 414/751.1 |
| 4,922,755 | A * | 5/1990 | Oshiro | B25J 9/102 74/490.03 |
| 5,212,432 | A * | 5/1993 | Ohtani | B25J 9/046 310/56 |
| 5,777,267 | A * | 7/1998 | Szydel | B25J 19/0025 174/72 A |
| 5,796,045 | A * | 8/1998 | Lancien | B29C 57/02 156/86 |
| 6,577,093 | B1 | 6/2003 | Hvittfeldt | B25J 17/0266 318/568.11 |
| 6,722,842 | B1 * | 4/2004 | Sawdon | B23K 37/0452 294/65 |
| 7,196,285 | B2 * | 3/2007 | Inoue | B23K 9/287 219/137.9 |
| 7,299,713 | B2 * | 11/2007 | Uematsu | B25J 19/0029 248/51 |
| 7,806,019 | B2 * | 10/2010 | Iwai | B25J 19/0025 414/918 |
| 8,246,633 | B2 * | 8/2012 | Omori | A61B 18/18 318/568.11 |
| 8,720,298 | B2 * | 5/2014 | Lehmann | B25J 15/0616 414/735 |
| 9,381,644 | B2 * | 7/2016 | Takahashi | B25J 19/0025 |
| 2005/0211686 | A1 | 9/2005 | Inoue et al. | |
| 2007/0031232 | A1 * | 2/2007 | Kurebayashi | B25J 19/0029 414/682 |
| 2010/0037721 | A1 | 2/2010 | Nakao et al. | |
| 2011/0033275 | A1 * | 2/2011 | Lehmann | B25J 15/0616 414/737 |
| 2011/0097184 | A1 * | 4/2011 | Kinoshita | B25J 17/0266 414/589 |
| 2012/0067157 | A1 * | 3/2012 | Suzuki | B25J 19/0025 74/490.02 |
| 2012/0118097 | A1 * | 5/2012 | Ilch | B25J 17/0266 74/490.05 |
| 2014/0014219 | A1 * | 1/2014 | Takemura | B25J 9/0012 138/140 |
| 2014/0069222 | A1 * | 3/2014 | Souk | B25J 9/0078 74/490.02 |
| 2014/0203068 | A1 | 7/2014 | Hino | |
| 2016/0229066 | A1 * | 8/2016 | Ilch | B25J 17/0266 |
| 2016/0229360 | A1 * | 8/2016 | Iimuro | H02G 11/00 |

FOREIGN PATENT DOCUMENTS

| | | |
|---|---|---|
| EP | 1579963 A1 | 9/2005 |
| EP | 2768097 A1 | 8/2014 |
| JP | S63-131389 U | 8/1988 |
| JP | H03-136788 A | 6/1991 |
| JP | 2002-293203 A | 10/2002 |
| JP | 2005-028558 A | 2/2005 |
| JP | 2009-125846 A | 6/2009 |
| JP | 2009-248288 A | 10/2009 |
| JP | 2012-240173 A | 12/2012 |
| JP | 2013-069623 A | 4/2013 |
| JP | 2013-106465 A | 5/2013 |

OTHER PUBLICATIONS

"6770 Series, Shimano Electronic Intelligent System." Shimano Ultegra 6770 Series Dealer's Manual Oct. 1, 2011: 1-33. PDF with Document Properties screeen shot and selected pages used.*
Di2 additional information. (Mar. 23, 2009). Retrieved Sep. 21, 2015, from https://eliflap.files.wordpress.com/2012/01/10-di2-wire-kit-instructions.pdf.*
Di2 additional information. (Mar. 23, 2009). Retrieved Sep. 21, 2015.; with Document properties screen shot and selected page(s) used.*
The extended European search report issued by the European Patent Office dated Sep. 30, 2014, which corresponds to European Patent Application No. 14002755.8-1712 and is related to U.S. Appl. No. 14/454,290.

* cited by examiner

WIRING STRUCTURE FOR ROBOT ARM

CROSS REFERENCE TO RELATED APPLICATIONS

This application claims benefit of priority to Japanese Patent Application No. 2013-166219 filed Aug. 9, 2013, and to Japanese Patent Application No. 2013-166220 filed Aug. 9, 2013, the entire content of each of which is incorporated herein by reference.

TECHNICAL FIELD

The present technical field relates to a wiring structure for a wire-shaped body (cable or pipe) in a robot arm.

BACKGROUND

Conventionally, an industrial robot (hereinafter abbreviated as robot) using a parallel link mechanism has been known. This robot includes a base section that is a support base, a head section including an end effector, and a plurality of arms that each connect the base section and the head section. The respective arms are driven separately and in conjunction with each other by a motor mounted to the base section, so that the position or attitude of a head is changed. The head is mounted with the end effector that is activated with an actuator such as an electric motor or air cylinder, and various works are executed by the end effector.

In this type of robot, a cable or pipe for supplying power, air, or the like for driving the end effector is often wired point to point with a margin to a degree that does not cause interference with each arm or routed along each arm to be fixed to the arm by a fixing member such as a binding band. Recently, as disclosed in Japanese Patent Application Laid-open No. 2009-248288, for example, a technique in which an arm is configured of a hollow rod and the rod is utilized as an air pipe has been also proposed.

The robot using a parallel link mechanism is often used for applications in food products such as sorting of packaged food products. Therefore, due to hygienic reasons or the like, it is conceivable that an exposure of a cable or the like is prevented by forming an arm with a hollow rod and routing the cable or the like inside the rod. In the case of the robot using a parallel link mechanism, the robot may be driven at high speed and accompanied by a movement such as instantly changing the moving direction. In such a case, it is conceivable that an abnormal noise is caused by a cable or the like hitting the inner circumferential surface of the rod.

SUMMARY

The present disclosure has been made in view of a situation described above, and an object is to route a wire-shaped body inside an arm member while preventing occurrence of an abnormal noise due to the wire-shaped body (cable or pipe) hitting the inner circumferential surface of the arm member forming a robot arm.

A wiring structure for a robot arm according to one aspect of the present disclosure includes a pair of arm members that each have a hollow shaft shape including a first end section and a second end section, and that are arranged to be parallel to each other, a wire-shaped body introduced into the arm member from the first end section and led out of the arm member through the second end section so as to penetrate at least one of the pair of arm members in an axis direction of the arm member, and a regulating member provided at least in an intermediate region of the arm member in the longitudinal direction to regulate a displacement of the wire-shaped body within the arm member in a radial direction of the arm member.

DETAILED DESCRIPTION

A preferred embodiment of the present disclosure will be described below in detail with reference to the accompanying drawings.

Figure 1:
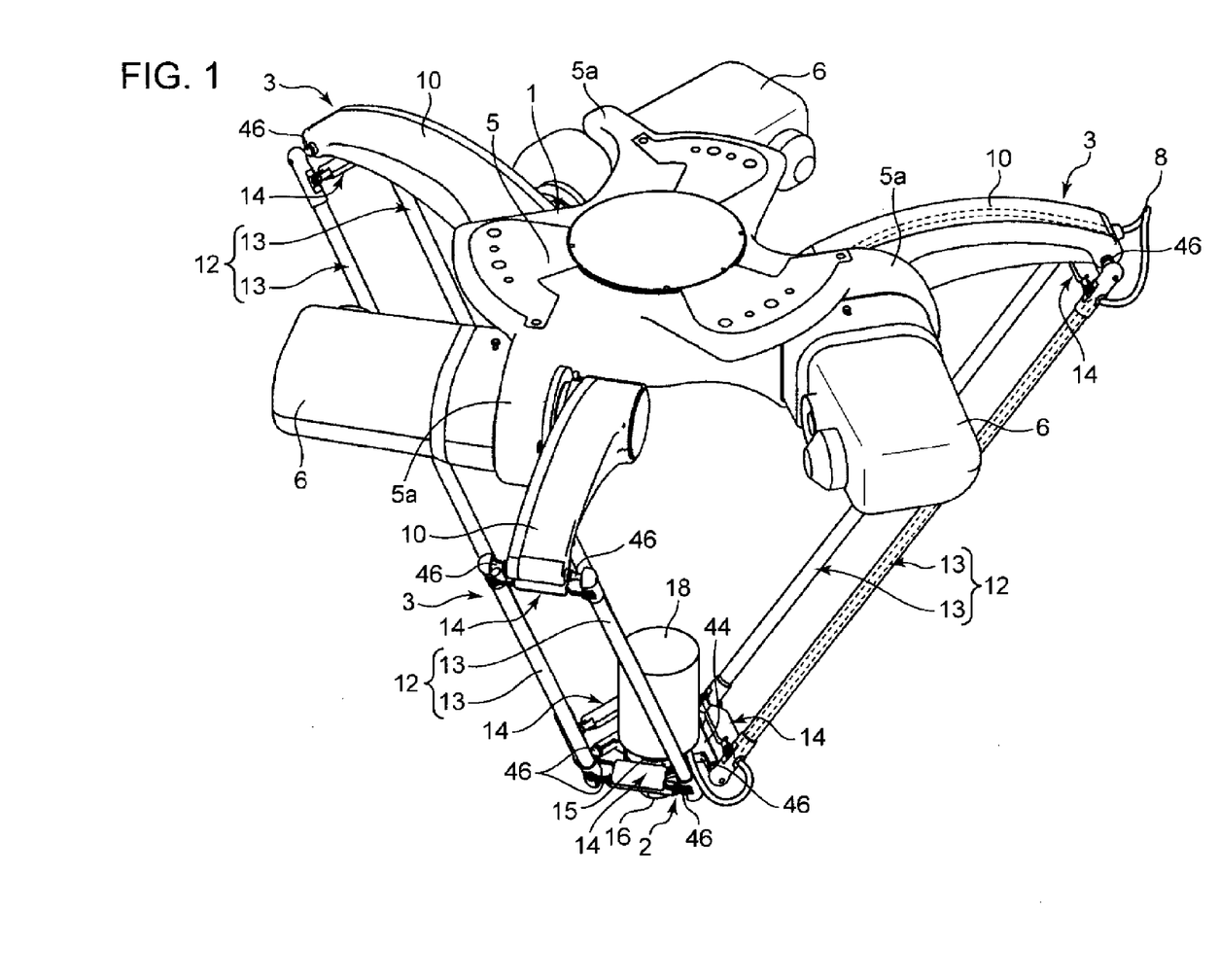
FIG. 1 is a perspective view showing an industrial robot (industrial robot using a parallel link mechanism) to which the present disclosure is applied.
Figure 2:
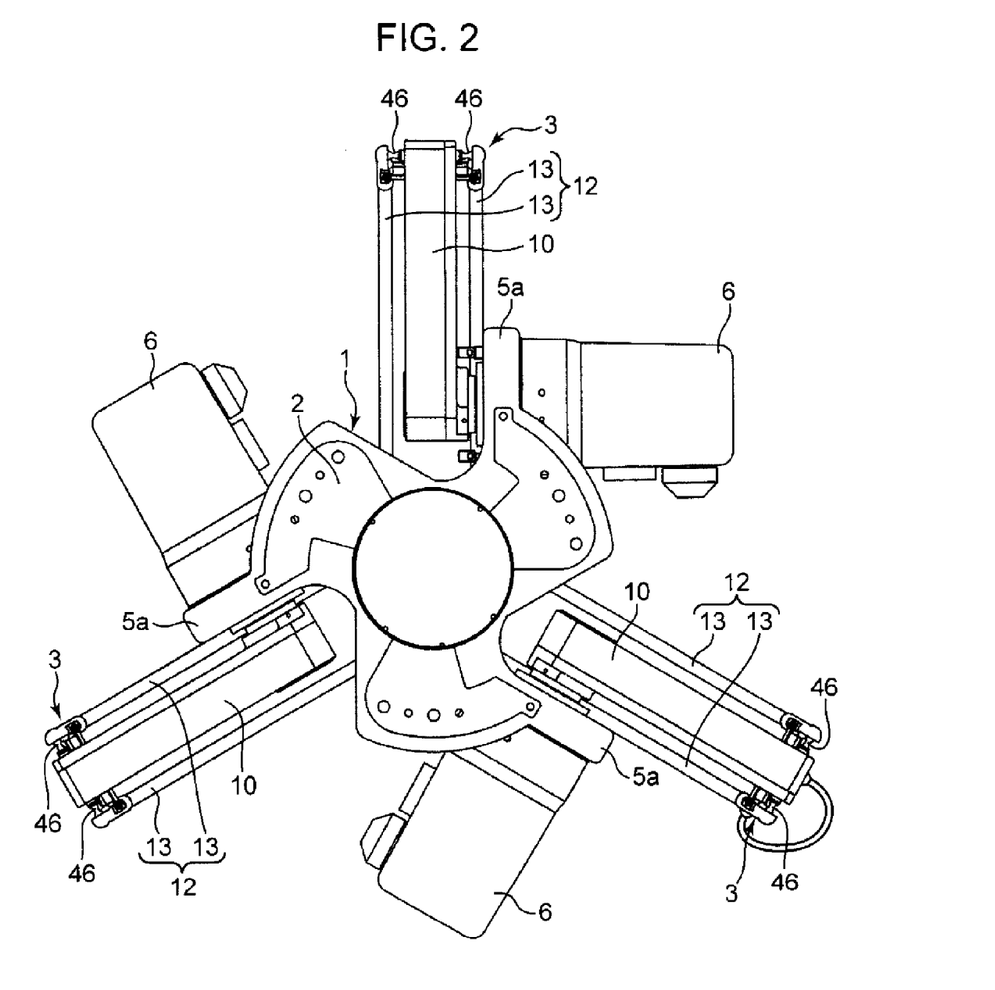
FIG. 2 is a plan view of the industrial robot.

FIG. 1 and FIG. 2 show an industrial robot according to the present disclosure. FIG. 1 and FIG. 2 show the industrial robot respectively in perspective view and plan view.

The industrial robot (hereinafter referred to simply as robot) shown in the figures is a robot using a parallel link mechanism. The robot in this example is applied for use in sorting of goods. That is, the robot is, for example, hung from and fixed to a ceiling or hung from and fixed to a frame member (not shown) formed in a tower shape, such that goods conveyed by a conveying device such as a belt conveyor arranged below the robot are held by suction and moved to be sorted.

The robot includes a base section 1 that is a support base fixed to the ceiling or the frame member, a head section 2 located below the base section 1, and three bendable arms 3 that each connect the base section 1 and the head section 2. The respective arms 3 are driven separately and in conjunction with each other to change the position or attitude of the head section 2. The head section 2 includes, as an end effector, a wide-mouthed nozzle member 16 for suction holding of goods through negative pressure.

As shown in the figure, the base section 1 includes a base body 5 and three arm drive motors 6 that are mounted to the base body 5 to each drive the arm 3.

The base body 5 includes three motor fixing sections 5a aligned at equal intervals (120° intervals) in the circumferential direction. The respective arm drive motors 6 are fixed to the motor fixing sections 5a in a horizontal manner, i.e., in an attitude in which an output shaft extends in the horizontal direction, and the arms 3 are respectively connected to the output shafts of the arm drive motors 6.

Each arm 3 includes a first arm 10 fixed to the output shaft of the arm drive motor 6 and driven about a horizontal axis and a second arm 12 (corresponding to a robot arm of the present disclosure) connected across a tip end section of the first arm 10 and the head section 2.

The second arm 12 includes a pair of arm members 13 extending parallel to each other and a connecting member 14 that connects the arm members 13 to each other in a predetermined position in the axis direction of the arm members 13. As will be described later in detail, the second arm 12 is swingably connected to the first arm 10 and the head section 2.

Figure 3:
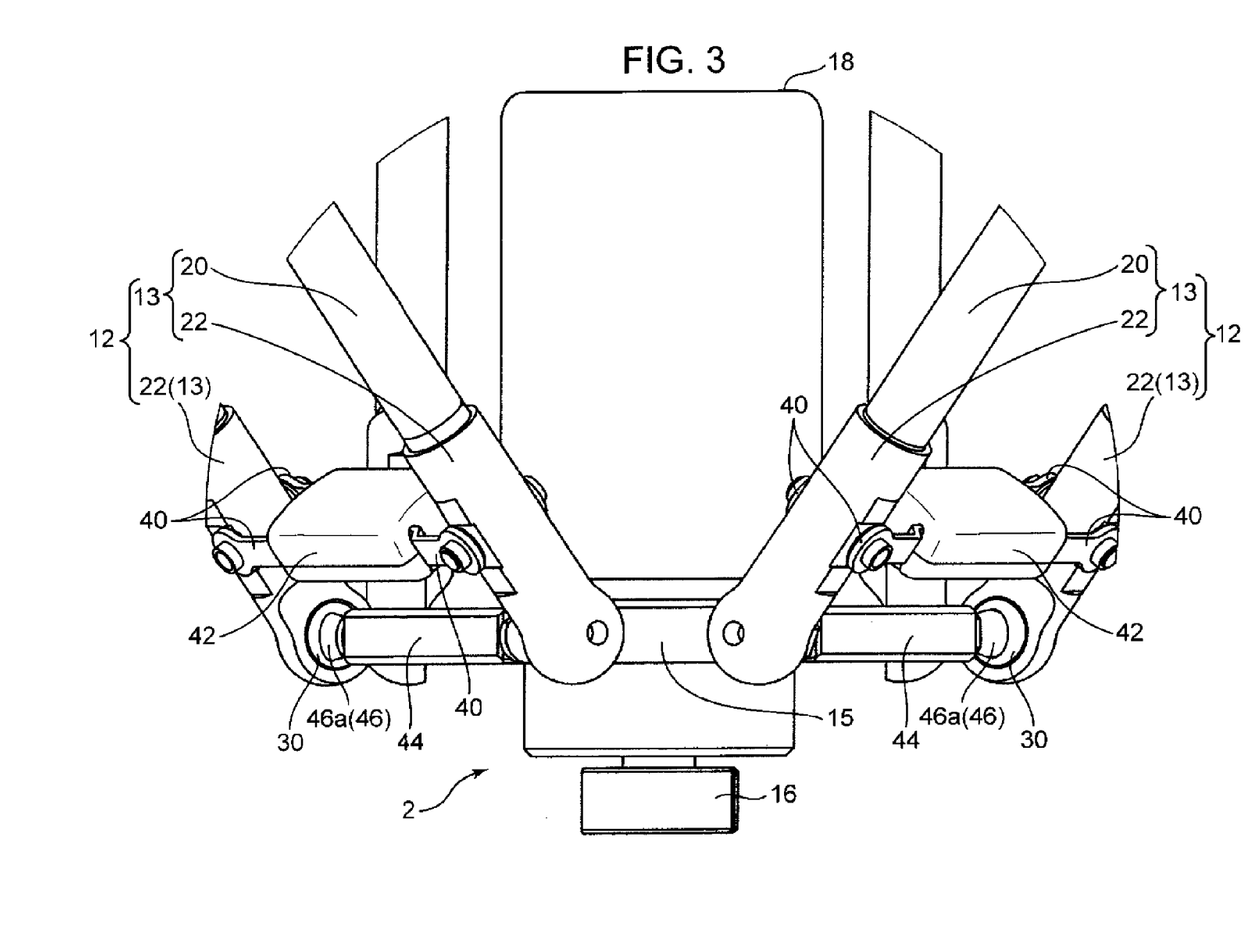
FIG. 3 is a side view showing a head section of the industrial robot.

As shown in FIG. 3, the head section 2 includes a bracket 15 to which the second arm 12 is connected, the nozzle member 16 rotatably held at the center of the bracket 15 with a bearing or the like therebetween, and a nozzle drive motor 18 that rotates and drives the nozzle member 16. The nozzle member 16 protrudes to the lower side from the bracket 15, and the nozzle drive motor 18 is fixed to the bracket 15 in a state of being arranged directly above the nozzle member 16.

Next, the specific configuration of the second arm 12 and the connecting structure for the first arm 10 as well as the head section 2 and the second arm 12 will be described.

As described above, the second arm 12 includes the pair of arm members 13 extending parallel to each other and the connecting member 14 that connects the arm members 13.

Figure 4:
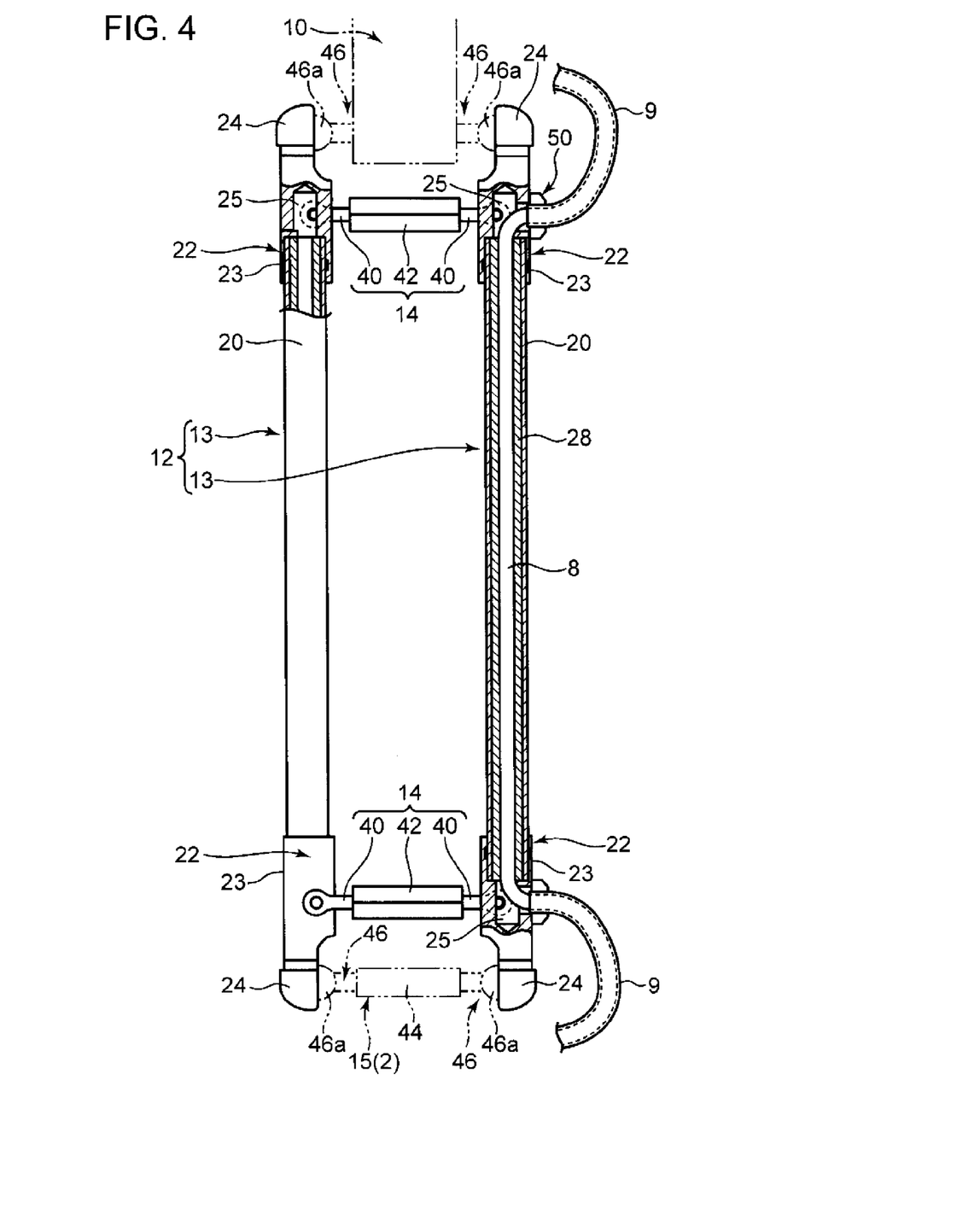
FIG. 4 is a plan view (partial sectional view) showing a second arm.
Figure 5:
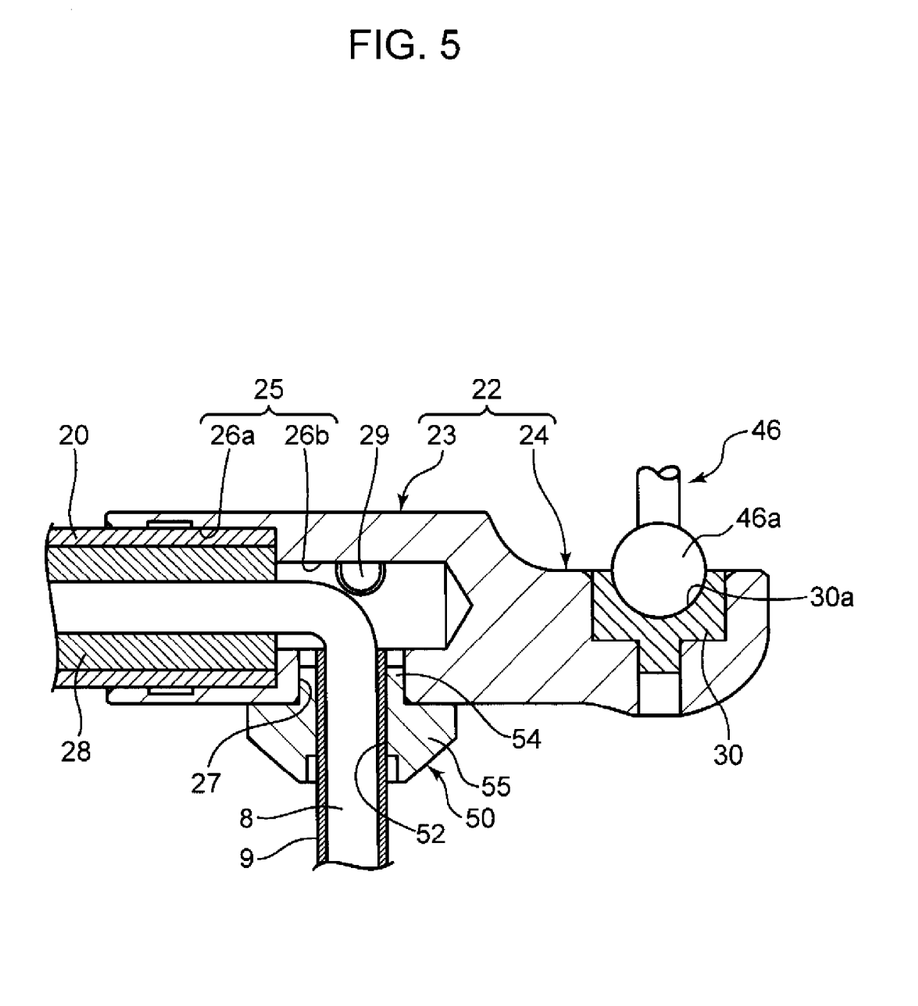
FIG. 5 is an enlarged view of a main section in FIG. 4 showing an end section of an arm member forming the second arm.

As shown in FIG. 3 to FIG. 5, the arm member 13 is hollow and shaft-shaped. Specifically, the arm member 13 includes a cylinder-shaped rod 20 formed of carbon fiber reinforced plastic or the like that is lightweight and high in strength and end caps 22 respectively fixed at both ends of the rod 20.

The end cap 22 is approximately shaft-shaped, includes a cylinder-shaped section 23 on one end side (left end side in FIG. 5) that accommodates an end section of the rod 20, and includes a cup-shaped socket section 24 on the other end side that forms a ball joint in cooperation with a ball stud 46 described later.

The cylinder-shaped section 23 includes a stepped hole 25 in which a large diameter section 26a opened toward the opposite side of the socket section and a small diameter section 26b with a smaller inner diameter than the large diameter section 26a are aligned in the axis direction. The rod 20 and the end cap 22 (cylinder-shaped section 23) are bonded to each other in a state where one end of the rod 20 is press-fitted into the stepped hole 25, specifically, in a state where the rod 20 is press-fitted into the stepped hole 25 such that the end section of the rod 20 is butted against a step portion formed at the boundary between the large diameter section 26a and the small diameter section 26b. Accordingly, the end caps 22 are fixed to both ends of the rod 20.

The socket section 24 is provided with an adapter 30 that accommodates a ball head section 46a of the ball stud 46. In the adapter 30, a sliding contact recess section 30a with a half-circle shaped sectional surface for sliding contact with the ball head section 46a is formed. The adapter 30 is provided to the socket section 24 such that the sliding contact recess section 30a faces a direction orthogonal to the axis direction of the end cap 22 (arm member 13).

The respective end caps 22 of one arm member 13 are each fixed to the rod 20 in a state of being positioned in the circumferential direction such that the sliding contact recess sections 30a face the same side. The pair of arm members 13 are arranged such that the sliding contact recess sections 30a of the respective arm members 13 face inwards (face each other), and the arm members 13 are connected to each other via the connecting member 14. In this example, as shown in FIG. 1 and FIG. 3, the respective arm members 13 are connected to each other by the connecting member 14 in positions of the respective end caps 22.

The connecting member 14 includes one set of two connecting pieces 40 (not shown in FIG. 5) axially supported to the end cap 22, a spring member (not shown) such as a tension coil spring hung across the connecting pieces 40 of each arm member 13, and a cover member 42 that covers the spring member.

The ball stud 46 forming the ball joint in cooperation with the socket section 24 (end cap 22) of each arm member 13 is assembled to the first arm 10 and the head section 2 to which the second arm 12 is connected.

To illustrate in detail, a connecting section 44 of each second arm 12 is provided to the bracket 15 of the head section 2 in a position corresponding to each first arm 10 in the circumferential direction of the bracket 15, as shown in FIG. 3. The connecting sections 44 form a shaft shape extending in a direction parallel to a rotating shaft of the corresponding first arm 10 (the output shaft of the arm drive motor 6). At both ends of the connecting sections 44, the respective ball studs 46 are fixed in a state where the ball head sections 46a face opposite sides of each other. In a similar manner, at the tip end sections of the respective first arms 10 on both sides in the width direction of the first arm 10 (both sides in a direction parallel to the output shaft of the arm drive motor 6), the respective ball studs 46 are fixed in a state where the ball head sections 46a face opposite directions from each other, as shown in FIG. 2.

At an upper end section of the second arm 12, as shown in FIG. 4, the socket section 24 (sliding contact recess section 30a) of each arm member 13 covers the ball head section 46a of each ball stud 46 of the first arm 10 from the outside (outside in the width direction of the first arm 10). At a lower end section of the second arm 12, the socket section 24 (sliding contact recess section 30a) of each arm member 13 covers the ball head section 46a of each ball stud 46 of the bracket 15 (connecting section 44) from the outside (outside in the width direction of the connecting section 44). Accordingly, the second arm 12 is swingably connected with respect to the first arm 10 and the head section 2.

The respective arm members 13 of the second arm 12 are biased in such a direction to approach each other by the elastic force of the spring member of the connecting member 14. Accordingly, a connected state of the second arm 12 with respect to the first arm 10 as well as the head section 2 is maintained in a state where the sliding contact recess section 30a of the socket section 24 is in sliding contact with the ball head section 46a of the ball stud 46.

Next, a wiring structure for a cable or the like in the robot will be described.

In one of the three arms 3 of the robot, as shown in FIG. 1, a wire-shaped body 8 including a pipe for supplying negative pressure to the nozzle member 16 mounted to the head section 2 and a cable (power line and signal line) for driving and controlling the nozzle drive motor 18 is wired (routed).

Roughly speaking, the wire-shaped body 8 is wired to the head section 2 from the base body 5 via the inside of the first arm 10 and the inside of the second arm 12. Specifically, the wire-shaped body 8 is introduced from a base end section into the first arm 10 and led out from the tip end of the first arm 10. Then, the wire-shaped body 8 is introduced from an upper end section into the arm member 13 on one side out of the pair of arm members 13 of the second arm 12 in a state where a slight play (looseness) is provided, penetrates the arm member 13 in the axis direction, is led out from a lower end section of the arm member 13, and wired to the head section 2 in a state where a slight play (looseness) is provided.

The end section of the arm member 13 is provided with the socket section 24 that accommodates the ball stud 46 of the first arm 10 and the head section 2, as described above. Thus, the wire-shaped body 8 is wired to penetrate the arm member 13 such that the socket section 24 is avoided.

Specifically, as shown in FIG. 4 and FIG. 5, an opening section 27 that communicates with the small diameter section 26b of the stepped hole 25 is formed at the side surface of the cylinder-shaped section 23 of the end cap 22 of the arm member 13 in which the wire-shaped body 8 is wired out of the pair of arm members 13 of the second arm 12. The opening section 27 is in an elliptical shape that is moderately elongated in the longitudinal direction (axis direction or left-right direction in FIG. 5) of the end cap 22 and is formed at the side surface of the cylinder-shaped section 23 in a position on the opposite side of the sliding contact recess section 30a side. Accordingly, with the small diameter section 26b of the stepped hole 25 and the opening section 27, a passage for wiring that bends perpendicularly from the side surface of the end cap 22 and communicates with the end section of the rod 20 is formed.

Then, the wire-shaped body 8 is inserted to the arm member 13 in a state of being bent approximately perpendicularly from the opening section 27 of the end cap 22 on the first arm 10 side and led out from the opening section 27 of the end cap 22 on the head section 2 side in a state of penetrating the rod 20 and being bent approximately perpendicularly. Accordingly, the wire-shaped body 8 penetrates the arm member 13 in a state where the socket sections 24 on both ends are avoided. That is, in this example, one of the two end caps 22 of the arm member 13 corresponds to a first end section of the present disclosure, and the other corresponds to a second end section.

Inside the arm member 13, a buffer material 28 (that is one example of a regulating member of the present disclosure) formed of an elastic material that regulates the displacement of the wire-shaped body 8 in the radial direction of the rod 20 is arranged to be interposed between the inner circumferential surface of the rod 20 and the wire-shaped body 8.

In this example, the buffer material 28 is formed of foamed resin such as foamed polyethylene. The buffer material 28 has a cylindrical shape surrounding the wire-shaped body 8 continuously over approximately the entire region of the arm member 13, specifically, the entire region of the rod 20 in the longitudinal direction. In this example, the buffer material 28 is formed in a cylindrical shape by a band body formed of foamed resin being longitudinally wrapped around the wire-shaped body 8.

Figure 6:
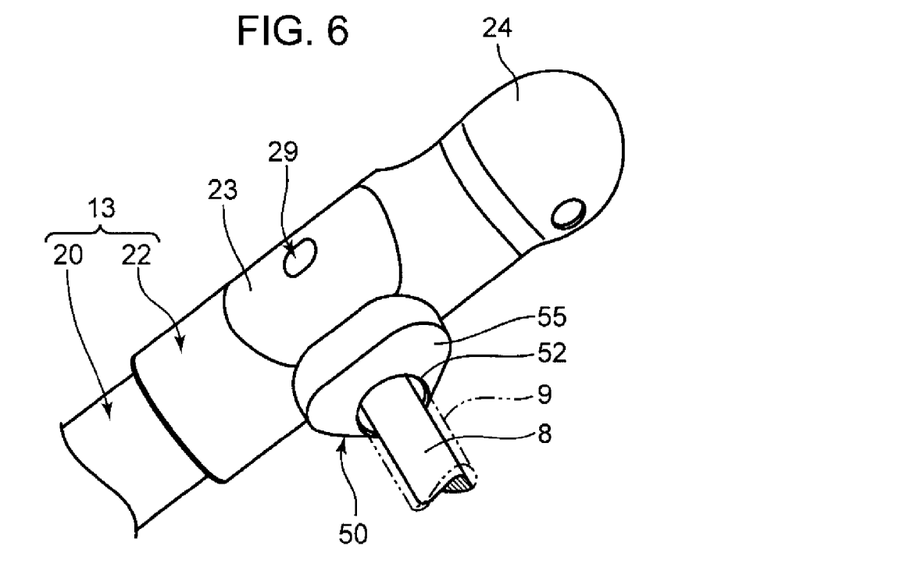
FIG. 6 is a perspective view showing the end section of the arm member.

As shown in FIG. 5 and FIG. 6, a grommet 50 (corresponding to a protective member of the present disclosure) formed of rubber is attached to the opening section 27 of each end cap 22 of the arm member 13. The wire-shaped body 8 is wired to the arm member 13 through an insertion hole 52 of the grommet 50. By the wire-shaped body 8 being surrounded by the grommet 50 at the opening section 27 in this manner, the wire-shaped body 8 is prevented from contacting an edge of the opening section 27 and being damaged.

The grommet 50 includes a fixing section 54 inserted to the opening section 27 of the end cap 22 and a holding section 55 that holds the wire-shaped body 8 outside the end cap 22. The fixing section 54 and the holding section 55 both have an elliptical contour that is elongated in the longitudinal direction of the end cap 22 (axis direction of the arm member 13 or first direction of the present disclosure). In the center of the fixing section 54 and the holding section 55, the insertion hole 52 of which the sectional surface is approximately a true circle is formed. That is, the grommet 50 is formed such that the thickness in a direction parallel to the major axis direction of the opening section 27 is larger than the thickness in a direction (corresponding to a second direction of the present disclosure) parallel to a minor axis direction of the opening section 27.

A tip end portion (portion on the opposite of the fixing section 54) of the holding section 55 of the grommet 50 is formed in an elliptical cone shape. Accordingly, the wire-shaped body 8 can be bent relatively easily in a portion at the grommet 50 along with a swing of the second arm 12 with respect to the first arm 10, while the wire-shaped body 8 is protected from damage due to contact with the edge of the opening section 27.

Portions of the wire-shaped body 8 that are exposed externally from the arm 3, i.e., a portion between the first arm 10 and the second arm 12 and a portion between the second arm 12 and the head section 2, are inserted to a tube 9 formed of vinyl having flexibility, as shown in FIG. 4 to FIG. 6. An end section of the tube 9 is inserted into the arm member 13 through the grommet 50 together with the wire-shaped body 8. Accordingly, the wire-shaped body 8 is doubly protected by the tube 9 and the grommet 50 in a position of the opening section 27 of the end cap 22.

In FIG. 5 and FIG. 6, reference numeral 29 denotes a penetration hole at which a shaft member for axially supporting the connecting piece 40 of the connecting member 14 is attached by insertion and that penetrates the end cap 22 to be orthogonal to the axis direction thereof.

With the robot described above, a large portion of the wire-shaped body 8 including the pipe for supplying negative pressure to the nozzle member 16 and the cable for driving and controlling the nozzle drive motor 18 are wired within the arm 3. Therefore, the wire-shaped body 8 is not swung around outside the arm 3 while the robot is operating, and it is advantageous in terms of hygiene and the like. Thus, the robot can be used suitably for applications relating to food products.

Since the buffer material 28 that regulates the displacement of the wire-shaped body 8 is arranged inside the rod 20 as described above for the arm member 13 to which the wire-shaped body 8 is wired in the second arm 12, the wire-shaped body 8 is prevented from hitting the inner circumferential surface of the rod while the arm 3 is active. Thus, occurrence of an abnormal noise due to such impact can be prevented.

Particularly, the buffer material 28 is formed of foamed resin (elastic material) such as foamed polyethylene and is in a cylindrical shape surrounding the wire-shaped body 8. Therefore, there is an advantage that the displacement of the wire-shaped body 8 can be regulated in a favorable manner without applying load on the wire-shaped body 8, regardless of how the second arm 12 (arm member 13) is swung.

In addition, the buffer material 28 is formed in a cylindrical shape surrounding the wire-shaped body 8 by the band body formed of foamed resin being longitudinally wrapped around the wire-shaped body 8, as described above. Therefore, it is advantageous in terms of cost, and there is also an advantage of high adaptability to a change in size (diameter) of the wire-shaped body. That is, although a dedicated buffer material formed in a cylindrical shape by injection molding may be used as the buffer material 28, preparing and using a dedicated part in this manner leads to an increase in cost. In the case of using a dedicated part, it is necessary upon a change in the size of the arm member 13 or the wire-shaped body 8 to newly mold a buffer material in accordance with the size. In contrast, with the configuration of the embodiment using the band body formed of foamed resin, it is advantageous in terms of cost since a commercially available foamed resin plate or the like can be cut and used, and a change in size of the arm member 13 or the wire-shaped body 8 can easily be dealt with by changing the way cutting is done.

The arm member 13 described above can be assembled by, for example, (1) longitudinally wrapping the band body of foamed resin around the wire-shaped body 8 in advance to form the buffer material 28, (2) inserting the wire-shaped body 8 and the buffer material 28 integrally into the rod 20 from one end side, and (3) passing both ends of the wire-shaped body 8 respectively through the end caps 22 and fixing the end caps 22 to both ends of the rod 20. In this case, it may be such that the band body of foamed resin is inserted in the rod 20 in a state of being rolled in advance and then the wire-shaped body 8 is inserted on the inside of the buffer material 28.

Figure 7:
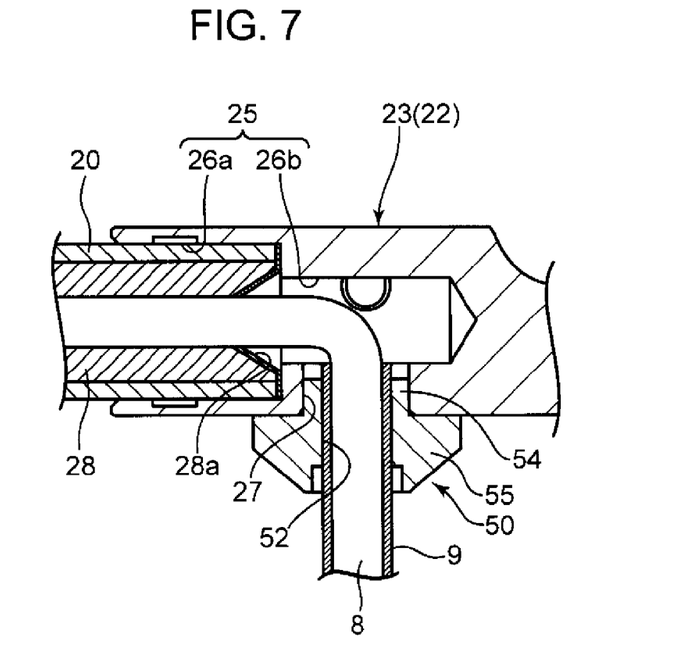
FIG. 7 is a sectional view showing the end section of the arm member (of a modified example).

The arm member 13 can be assembled also by (1) inserting the band body of foamed resin in the rod 20 in a state of being longitudinally-wrapped and rolled in advance, (2) fixing the end caps 22 to both ends of the rod 20, and (3) passing the wire-shaped body 8 through the arm member 13 via the opening section 27 of the end cap 22. In the case where the buffer material 28 is inserted into the rod 20 in advance and then the wire-shaped body 8 is inserted on the inside of the buffer material 28 in this manner, it is preferable that a tapered guiding section 28a for bringing in the wire-shaped body 8 be provided at one end section of the buffer material 28 in the longitudinal direction (i.e., end section on a side on which the wire-shaped body 8 is inserted), as shown in FIG. 7. The guiding section 28a may be formed by cutting the buffer material 28 or may be an attached molded product of resin or the like. With this configuration, it is possible to insert the wire-shaped body 8 smoothly on the inside of the buffer material 28. Particularly, in the case of inserting the wire-shaped body 8 from the opening section 27 after the end cap 22 is fixed to the rod 20, it is necessary to insert the wire-shaped body 8 on the inside of the buffer material 28 in a state of being bent approximately perpendicularly. Therefore, in the case where the guiding section 28a is not provided, the wire-shaped body 8 is butted against an end section of the buffer material 28, and insertion is difficult. However, with a configuration in which the guiding section 28a is provided to an end section of the opening section 27 as shown in the drawing, there is an advantage that the ease of assembly of the arm member 13 improves since the wire-shaped body 8 is inserted on the inside of the buffer material 28 smoothly along the guiding section 28a. In this case, an uneven surface of the buffer material 28 acts as an insertion resistance for the wire-shaped body 8 to affect the ease of insertion. Therefore, the surface of the buffer material 28 where the buffer material 28 contacts the wire-shaped body 8 is preferably a smooth surface without a substantial step in the axis direction of the rod 20.

With the robot, there is also the following advantage. That is, since the wire-shaped body 8 is routed inside the arm member 13 via the grommet 50 attached to the end cap 22, the wire-shaped body 8 is effectively prevented from being pushed against the edge of the opening section 27 and damaged along with a swing of the arm 3. More specifically, in the structure in which the wire-shaped body 8 is wired within the arm member 13 from the side surface of the end cap 22 to avoid the socket section 24 as described above, the wire-shaped body 8 is inserted into the arm member 13 (second arm 12) with a small radial dimension and bent in an L-shape in a state where there is hardly any freedom for a movement to change the direction. Therefore, even if there is sufficient length of the wire-shaped body 8 between the first arm 10 and the second arm 12, the wire-shaped body 8 is pushed strongly against the edge (edge on the first arm 10 side) of the opening section 27 of the end cap 22 on the upper side due to the restoring force of itself, when the second arm 12 is swung in a direction shown by a solid line in FIG. 4, for example. Therefore, in the case where the grommet 50 is not provided, it is conceivable that the wire-shaped body 8 inserted through the opening section 27 is pushed strongly against the edge of the opening section 27 on the socket section 24 side (first arm 10 side) to be damaged. In a similar manner, when the second arm 12 is swung in a direction shown by a broken line in FIG. 4, it is conceivable that the wire-shaped body 8 inserted through the opening section 27 of the end cap 22 on the lower side of the arm member 13 is pushed strongly against the edge of the opening section 27 on the socket section 24 (head section 2) side due to the restoring force of itself to be damaged. However, with the robot of the embodiment, such inconvenience is effectively prevented, since the wire-shaped body 8 is routed inside the arm member 13 via the grommet 50 attached to the end cap 22.

Particularly, the grommet 50 is formed in an elliptical shape elongated in the axis direction of the end cap 22, as described above. That is, since the thickness in a direction parallel to the major axis direction of the opening section 27 is formed to be larger than the thickness in a direction parallel to the minor axis direction of the opening section 27, the durability is high in a portion where the wire-shaped body 8 comes into contact due to the restoring force of itself as described above. Thus, there is also an advantage that the wire-shaped body 8 can be prevented over a long period from being pushed against the edge of the opening section 27 due to the restoring force of itself while preventing an increase in size of the entire grommet 50. With the embodiment, there is also an advantage that the grommet 50 can be prevented from rotating and being directed in an unintended direction while the arm is operating, since the opening section 27 of the end cap 22 is formed in an elliptical shape and the fixing section 54 of the grommet 50 is also formed with an elliptical sectional surface.

By being inserted to the tube 9 formed of vinyl having flexibility and inserted in the grommet 50 together with the tube 9, the wire-shaped body 8 is doubly protected by the grommet 50 and the tube 9. Thus, there is also an advantage that the wire-shaped body 8 is prevented at a higher level from being pushed against the edge of the opening section 27 and damaged.

The robot described above is shown as an example of a preferred embodiment of an industrial robot to which a wiring structure for a robot arm according to the present disclosure is applied. The specific configuration is appropriately changeable without departing from the gist of the present disclosure.

For example, in the embodiment, the buffer material 28 is in a cylindrical shape surrounding the wire-shaped body 8.

Figure 8:
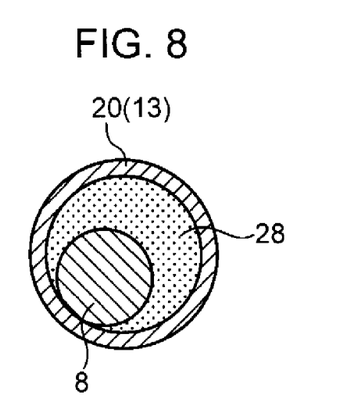
FIG. 8 is a sectional view showing the end section of the arm member (of a modified example).

However, the buffer material 28 does not necessarily need to be in a cylindrical shape, as long as the buffer material 28 is interposed between the inner circumferential surface of the rod 20 and the wire-shaped body 8 to regulate the displacement of the wire-shaped body 8. That is, for example, the shape may be such that the buffer material 28 surrounds approximately 270° of the outer circumference of the wire-shaped body 8, instead of surrounding the entire 360° circumference. In this case, the buffer material 28 is partially absent in the circumferential direction, and a step is formed as a result. However, the step is formed in the circumferential direction of the rod 20 and not in the axis direction of the rod 20. Therefore, the insertion resistance for the wire-shaped body 8 is not influenced. It is regarded that the outer circumference of the wire-shaped body 8 is surrounded in such a case as well. In addition, as shown in FIG. 8, for example, the buffer material 28 may be provided between the wire-shaped body 8 and the inner circumferential surface of the rod 20 so as to push the wire-shaped body 8 against the inner circumferential surface side of the rod 20. Such a configuration can be obtained by inserting the wire-shaped body 8 to the rod 20 and then filling the rod 20 with foamed resin, for example. In this case, foamed resin is partially absent between the wire-shaped body 8 and the inner circumferential surface of the rod 20 in a portion where there is contact. However, it is regarded that the outer circumference of the wire-shaped body 8 is surrounded in such a case as well.

In the embodiment, the buffer material 28 is provided continuously over the entire region of the rod 20 in the longitudinal direction. However, the buffer material 28 does not necessarily need to be provided in the entire region, as long as occurrence of abnormal noise along with the displacement of the wire-shaped body 8 within the rod 20 can be prevented. Since the wire-shaped body 8 is most easily displaced in an intermediate region of the rod 20 in the longitudinal direction, the buffer material 28 is preferably provided at least in the intermediate region. As long as the displacement of the wire-shaped body 8 can be regulated, the buffer material 28 does not necessarily need to be provided continuously and may be provided intermittently.

The buffer material 28 is configured of foamed resin such as foamed polyethylene in the embodiment, but obviously may be configured of other materials.

In the embodiment, the displacement of the wire-shaped body 8 within the rod 20 is regulated by the buffer material 28. However, as shown in FIG. 9A and FIG. 9B, the displacement of the wire-shaped body 8 within the rod 20 may be regulated using a binding band 60 (that is one example of the regulating member of the present disclosure).

Figure 9A:
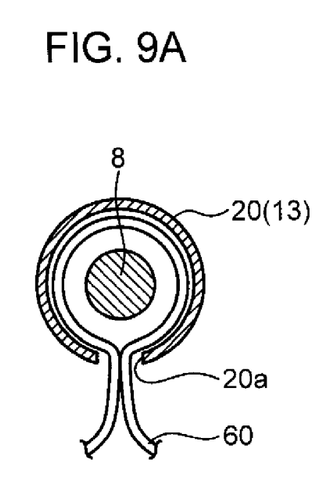
FIG. 9A is a sectional view of the arm member showing a state where the wire-shaped body is inserted in the rod body to illustrate a modified example of a wiring structure for a wire-shaped body.
Figure 9B:
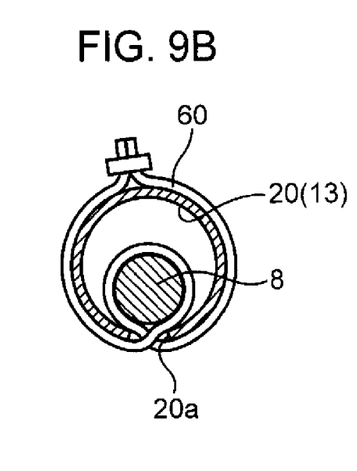
FIG. 9B is a sectional view of the arm member showing a state where the wire-shaped body is fixed to the rod body by a binding band to illustrate the modified example of the wiring structure for a wire-shaped body.

In this case, it is necessary that the rod 20 be provided with an opening section 20a for insertion of the binding band, as shown in FIG. 9A. The opening section 20a is formed in one or a plurality of positions in the longitudinal direction of the rod 20 including at least the intermediate region of the rod 20. At the time of assembly of the arm member 13, the binding band 60 is inserted into the rod 20 from the opening section 20a in a state where the binding band 60 is folded in two and both ends of the binding band 60 remain outside, as shown in FIG. 9A, and a loop is formed along the inner circumferential surface of the rod 20. In this state, the wire-shaped body 8 is inserted to the rod 20. Then, the binding band 60 is pulled to draw the wire-shaped body 8 toward the opening section 20a side, and the binding band 60 is wound around the rod 20 and bound, as shown in FIG. 9B. In this case, the binding band 60 surrounds the entire outer circumference of the wire-shaped body 8. With such a configuration as well, the displacement of the wire-shaped body 8 within the rod 20 can be regulated in a similar manner to the robot of the embodiment. Thus, occurrence of an abnormal noise due to the wire-shaped body 8 hitting the inner circumferential surface of the rod can be effectively prevented.

Figure 10:
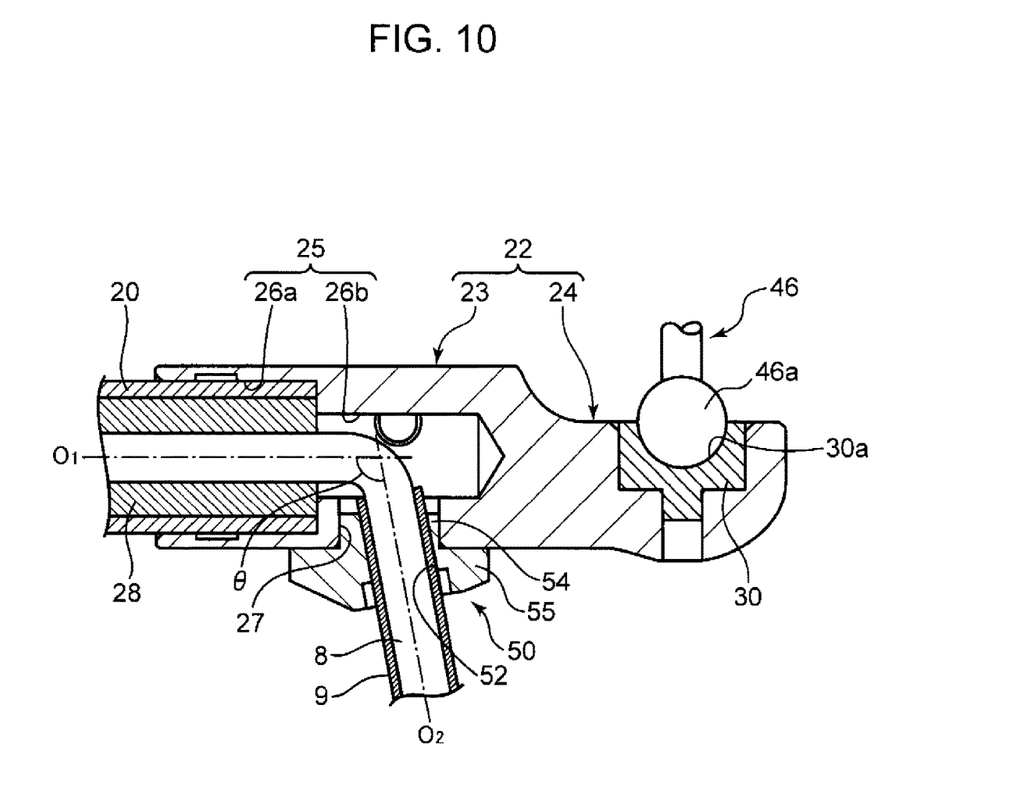
FIG. 10 is a sectional view showing the end section of the arm member (of a modified example).

In the embodiment, the insertion hole 52 of the grommet 50 is provided such that the central axis thereof is orthogonal with respect to the central axis of the end cap 22 (cylinder-shaped section 23), i.e., such that the angle of a bent portion of the wire-shaped body 8 routed in the rod 20 from the opening section 27 is approximately a right angle, as shown in FIG. 5. However, for example, the insertion hole 52 of the grommet 50 may be provided such that a central axis $O_2$ thereof intersects with a central axis $O_1$ of the end cap 22 (cylinder-shaped section 23) at an obtuse angle, as shown in FIG. 10, i.e., such that the angle of the bent portion is an obtuse angle. Such a configuration is advantageous in cases where, for example, there are a large number of pipes or cables and the diameter of the wire-shaped body 8 is large, since the bending stress of the wire-shaped body 8 at the bent portion can be reduced.

In examples of FIG. 5 and FIG. 10, the grommet 50 surrounding the entire circumference of the wire-shaped body 8 is provided as the protective member of the present disclosure. However, the wire-shaped body 8 does not necessarily need to be surrounded. That is, as described above, it is the wire-shaped body 8 being pushed against the edge of the opening section 27 due to the restoring force of itself that should particularly be prevented in the structure in which the wire-shaped body 8 is wired within the arm member 13 from the side surface of the end cap 22 to avoid the socket section 24. Thus, the protective member does not necessarily need to surround the wire-shaped body 8 and may be provided to be located at least on the outside of the bent portion of the wire-shaped body 8, i.e., on the socket section 24 side at the opening section 27 as the reference. The protective member (grommet 50) may be formed of resin instead of rubber.

In the embodiment, an example in which the industrial robot according to the present disclosure is used for sorting of goods has been described. However, application of the robot is not limited to sorting of goods, and various applications are possible.

The present disclosure described above is summarized as follows.

A wiring structure for a robot arm according to one aspect of the present disclosure includes a pair of arm members that each have a hollow shaft shape including a first end section and a second end section, and that are arranged to be parallel to each other, a wire-shaped body introduced into the arm member from the first end section and led out of the arm member through the second end section so as to penetrate at least one of the pair of arm members in an axis direction of the arm member, and a regulating member provided at least in an intermediate region of the arm member in the longitudinal direction to regulate a displacement of the wire-shaped body within the arm member in a radial direction of the arm member.

With the wiring structure, the wire-shaped body is prevented from hitting the inner circumferential surface of the arm member, since the displacement of the wire-shaped body is regulated by the regulating member. Particularly since the regulating member is provided in a region in the longitudinal direction of the arm member in which the wire-shaped body is most easily flexed, i.e., at least in the intermediate region of the arm member in the longitudinal direction, the displacement of the wire-shaped body can be effectively prevented. Thus, occurrence of an abnormal noise due to the wire-shaped body hitting the inner circumferential surface of the arm member can be effectively prevented.

In the present disclosure, the "wire-shaped body" is meant to include general wire-shaped members such as a pipe in addition to an electric wire (cable), and to "wire" means to route the wire-shaped member along a predetermined route. To be "provided at least in an intermediate region" includes a case where the regulating member is provided intermittently, in addition to a case of being provided continuously in the axis direction of the arm member.

In the wiring structure, the regulating member preferably has a shape surrounding an outer circumference of the wire-shaped body. In this case, it is preferable that an entire outer circumference of the wire-shaped body be surrounded.

With the wiring structure, the wire-shaped body can be prevented from hitting the inner circumferential surface of the arm member regardless of the direction, and it is possible to prevent occurrence of an abnormal noise at a higher level.

In the wiring structure, the regulating member is preferably a buffer material that is formed of an elastic material and is interposed between an inner circumferential surface of the arm member and the wire-shaped body.

With the wiring structure, the displacement of the wire-shaped body can be regulated in a favorable manner without applying load on the wire-shaped body, since the regulating member is the buffer material formed of the elastic material.

In this case, the regulating member may be molded in a cylindrical shape in advance by injection molding or the like. However, the regulating member is preferably formed in a cylindrical shape by a band body formed of the elastic material being longitudinally wrapped around the wire-shaped body.

With the wiring structure, it is advantageous in terms of cost since a commercially available plate-shaped buffer material can be applied directly, and a change in size (diameter) of the arm member or the wire-shaped body can be dealt with easily.

In the wiring structure, the regulating member is preferably provided approximately entirely from the first end section up to the second end section of the arm member.

With the wiring structure, the wire-shaped body can be prevented from hitting the inner circumferential surface of the arm member over approximately the entire length of the arm member.

In the wiring structure, a tapered guide section for assisting the wire-shaped body to be introduced into the arm member is preferably formed at a terminal portion, of an end section of the regulating member, on the first end section side of the arm member.

With the wiring structure, it is possible to insert the wire-shaped body with ease on the inside of the regulating member along the guide section from the side of the first end section, in a state where the regulating member is inserted in advance on the inside of the arm member. Therefore, ease of assembly of the wire-shaped body to the arm member improves.

In the wiring structure, a surface of the regulating member where the regulating member contacts the wire-shaped body is preferably a smooth surface without a substantial step in the axis direction of the arm member.

With the wiring structure, it is possible to prevent the wire-shaped body from being stuck along the regulating member to ensure a smooth and easy insertion, in the case where the wire-shaped body is inserted on the inside of the regulating member from the side of the first end section in a state where the regulating member is inserted in advance on the inside of the arm member.

The wiring structure is applicable as long as the arm member is in a hollow shaft shape, regardless of the sectional shape. However, in terms of improving the ease of assembly of the regulating member or the wire-shaped body to the arm member, a sectional shape of an inner circumferential surface of the arm member in a direction perpendicular to the axis direction of the arm member is preferably a circle.

The wiring structure according to one aspect of the present disclosure may be such that a protective member that protects the wire-shaped body is provided, the arm member has an opening section at a side surface of the first end section or a side surface of the second end section, the wire-shaped body is inserted in a bent state to the arm member through the opening section, and the protective member is provided to the opening section to be located on an outside of the bent portion of the wire-shaped body.

With the wiring structure, the restoring force of the wire-shaped body can be effectively absorbed, since the protective member is provided to the opening section to be located at least on the outside of the bent portion of the wire-shaped body. Therefore, the wire-shaped body can effectively be prevented from being pushed against an edge of the opening section and damaged.

In the wiring structure, the protective member preferably surrounds the wire-shaped body at least at an edge of the opening section.

With the wiring structure, the wire-shaped body is prevented from being pushed against the edge of the opening section due to the restoring force of itself.

In this case, a thickness of the protective member in a first direction parallel to the axis direction of the arm member that is a thickness of a portion, of the protective member, located on the outside of the bent portion of the wire-shaped body is preferably larger than a thickness of the protective member in a second direction orthogonal to the first direction.

With the wiring structure, the restoring force of the wire-shaped body can be effectively absorbed while preventing the wire-shaped body from being pushed against the edge of the opening section, also in the case where the wire-shaped body is pulled in a direction other than to the outside in the axis direction of the arm member.

It is preferable that the opening section be a long hole elongated in the first direction, and the thickness of the protective member in the first direction be larger than the thickness thereof in the second direction.

With the wiring structure, the durability of the protective member particularly in a portion where the wire-shaped body comes into contact due to the restoring force of itself improves. Therefore, it is possible to prevent the wire-shaped body over a long period from being pushed against the edge of the opening section due to the restoring force of itself while preventing an increase in size of the entire protective member.

With the wiring structure, an angle of the bent portion of the wire-shaped body is preferably an obtuse angle. In other words, it is preferable that the protective member include an insertion hole through which the wire-shaped body passes, and the insertion hole be formed such that a central axis thereof intersects with a central axis of the arm member at an obtuse angle.

With the wiring structure, it is possible to reduce the restoring force of the wire-shaped body in the bent portion.

Therefore, it is advantageous in terms of routing the wire-shaped body with a large diameter and large restoring force to the arm member.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. A wiring structure for a robot arm, comprising:
a pair of arm members that each have a hollow shaft shape including a first end section and a second end section, and that are arranged to be parallel to each other;
a wire-shaped body introduced into the arm member from the first end section and led out of the arm member through the second end section to penetrate at least one of the pair of arm members in a longitudinal axis direction of the arm member; and
a regulating member regulating a position of the wire-shaped body approximately parallel with a central axis of the arm member, wherein
the arm member includes a rod having a hollow portion extending through in the longitudinal axis direction of the arm member, and a pair of end caps fixedly attached to opposite ends of the rod to thereby form the first end section and the second end section,
the regulating member is a buffer material formed of a foamed resin, is in contact with an inner circumferential surface of the rod entirely in a longitudinal axis direction of the rod, and is in contact with an entirety of the wire-shaped body disposed in the rod in a longitudinal axis direction of the wire-shaped body,
each of the pair of end caps has a cylinder-shaped section extending in the longitudinal axis direction of the rod to receive the rod inserted therein, and a socket section to form a ball joint in cooperation with a ball stud at one end portion of the cylinder-shaped section opposite to another end portion thereof where the rod is located,
the socket section having one side surface formed with a ball receiving section to receive a ball head section of the ball stud in the at least one of the pair of the arm members in such a manner as to face another of the pair of the arm members, and
the cylinder-shaped section having a stepped hole defined by a large diameter section and a small diameter section continuous to the large diameter section, a step portion located between the large diameter section and the small diameter section in such a manner as to be in contact with a tip end of the rod and with a tip end of the regulating member, and an opening section formed through one circumferential surface of the cylinder-shaped section opposite to the other circumferential surface thereof where the ball receiving section is formed in such a manner that the small diameter section of the stepped hole communicates with an outside of the cylinder-shaped section, and
the wire-shaped body is inserted into the small diameter portion of the stepped hole through the opening section and further extends from the tip end of the rod to reach an inside thereof through the small diameter portion.

2. The wiring structure for the robot arm according to claim 1, wherein a tapered guide section for assisting the wire-shaped body to be introduced into the regulating member is formed at a terminal portion of an end section of the regulating member on a side of the first end section.

3. The wiring structure for the robot arm according to claim 1, wherein a surface of the regulating member that contacts the wire-shaped body is a smooth surface.

4. The wiring structure for the robot arm according to claim 1, wherein a sectional shape of the inner circumferential surface of the rod in a direction perpendicular to the longitudinal axis direction of the rod is a circle.

5. The wiring structure for the robot arm according to claim 1, further comprising a protective member that protects the wire-shaped body, wherein
the wire-shaped body is inserted in a bent state to the arm member through the opening section, and
the protective member is attached to the opening section that is located on an outside of a bent portion of the wire-shaped body.

6. The wiring structure for the robot arm according to claim 5, wherein the protective member surrounds the wire-shaped body at least at an edge of the opening section.

7. The wiring structure for the robot arm according to claim 6, wherein a thickness of the protective member in a first direction that is parallel to the longitudinal axis direction of the arm member that is a thickness of a portion of the protective member that is located on the outside of the bent portion of the wire-shaped body is larger than a thickness of the protective member in a second direction that is orthogonal to the first direction.

8. The wiring structure for the robot arm according to claim 7, wherein the opening section is a long hole elongated in the first direction, and
the thickness of the protective member in the first direction is larger than the thickness thereof in the second direction.

9. The wiring structure for the robot arm according to claim 5, wherein an angle of the bent portion of the wire-shaped body is an obtuse angle.

10. The wiring structure for the robot arm according to claim 5, wherein the protective member includes an insertion hole through which the wire-shaped body passes, and
the insertion hole is formed such that a central axis thereof intersects with the central axis of the arm member at an obtuse angle.

11. The wiring structure for the robot arm according to claim 1, further comprising:
a tube surrounding the wire-shaped body to protect the wire-shaped body outside the arm member, a tip end of the tube located in the opening section of the end cap.

12. The wiring structure for the robot arm according to claim 11, further comprising:
a protective member attached to the end cap in a state of being interposed between an inner circumferential surface of the opening section and the tube to protect the wire-shaped body.

* * * * *